F. FIEDLER.
Apparatus for Condensing Volatile Metallic Substances.

No. 147,923.  Patented Feb. 24, 1874.

Witnesses
John L. Boone
C. Milton Richardson

Ferdinand Fiedler
by Dewey & Co.
Attys

UNITED STATES PATENT OFFICE.

FERDINAND FIEDLER, OF NEW ALMADEN, CALIFORNIA.

IMPROVEMENT IN APPARATUS FOR CONDENSING VOLATILE METALLIC SUBSTANCES.

Specification forming part of Letters Patent No. 147,923, dated February 24, 1874; application filed November 22, 1873.

*To all whom it may concern:*

Be it known that I, FERDINAND FIEDLER, of New Almaden, Santa Clara county, State of California, have invented an Improved Condenser and Cooler; and I do hereby declare the following description and accompanying drawings are sufficient to enable any person skilled in the art or science to which it most nearly appertains to make and use my said invention or improvement without further invention or experiment.

The object of my invention is to provide an improvement in the vessels or tanks which are used for condensing volatile fumes, (especially mercurial fumes,) but which can also be used as a refrigerator or cooler for various purposes.

In order to explain my invention, so that others will be able to understand its construction and operation, reference is had to the accompanying drawings, in which—

Figure 1:
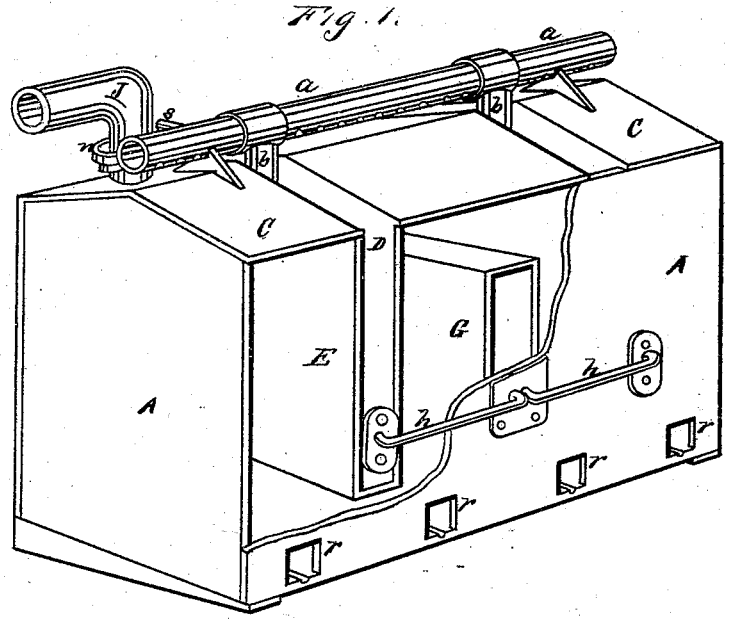
Figure 2:
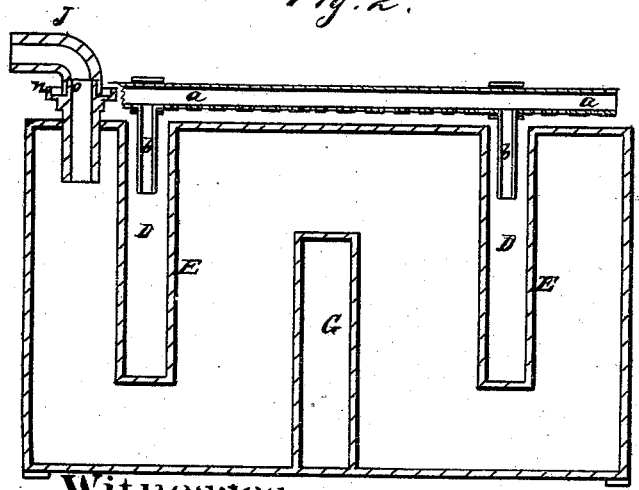
Figure 3:
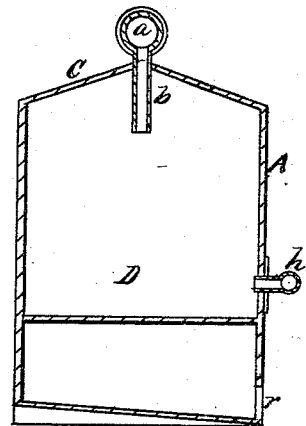

Figure 1 is a perspective view. Fig. 2 is a side sectional elevation. Fig. 3 is a transverse section.

A represents a tank, such as is used to form one of a series of condensing-tanks, through which volatile fumes are drawn or forced in order to be reduced to a liquid form. This tank I provide with a roof, C, which slightly slopes each way from the middle line. I then form a well, D, near each end of the tank, by cutting a transverse slot directly across the top C, and constructing a narrow box, E, inside of the tank, which extends almost to the bottom, thus providing a double-wall partition from the top to near the bottom, as shown, the tops of the walls only being open. Midway between these walls or partitions I secure, to the bottom of the tank, a narrow box or compartment, G, which extends upward to near the top of the tank, the boxes being arranged similar to the alternating partitions of an ordinary condensing-tank. A curved pipe, *h*, outside of the tank, upon one side, connects the bottoms of the wells D with the upper end of the box G. These partitions serve as water-reservoirs to cool the fumes which are passed through the tank. The fumes are introduced through a pipe, J, which communicates with the tank, near one end, through the top C, between one of the wells D and the end of the tank. To render the joint formed by connecting this pipe with the top of the tank perfectly tight, so as to prevent the escape of any of the fumes, I make a water-tight joint by forming two vertical annular ledges, *n o*, around the opening in the top of the tank, over which the pipe J is secured. The inside flange *o* is slightly higher than the outer one, and is placed at a short distance from the pipe so as to form a cup outside of it. When the water flows through the pipe *a* it will stand in the cup and cover the joint, even when the pan itself is empty. The water is prevented from flowing into the tank through the opening covered by the pipe by the higher inside flange *o*. The end of the pipe J is fitted over the inside annular flanges, so that the higher inside flange is inside of the pipe, while the lower one is outside of it. The water thus covers the joint and prevents leakage. A pipe, *a*, the under side of which is perforated with numerous fine holes, extends along the comb or ridge of the roof C longitudinally with it. A branch pipe, *b*, leads from the pipe *a* into each of the wells D, while another pipe, *s*, leads to the space between the flanges *n o*. Water is admitted into the pipe *a* so that the branch pipes *b* will supply the wells D and keep them filled. The pipe *s* keeps the joint protected, while the perforations allow the water to fall in a spray upon the roof C, and run down over the sides, thus providing a complete water covering over the tank, and fresh water continually inside of it. The fumes being admitted at one end of the tank are compelled to pass under and over the water-partitions, being brought in contact with the cold sides of the partitions during their passage, and are thus readily condensed, the mercury settling upon the inclined bottom of the tank, from which it flows off through the ports *r*.

By the above construction I provide an arrangement for keeping up a continuous circulation of cold water both upon the outside and through the interior of the tank, so that whatever is contained in it is readily condensed and cooled.

I am aware that condensers and coolers of this class have been constructed with water divisions and compartments, as in the patent to I. C. Coult, April 2, 1867, and these I do not claim broadly.

Having thus described my invention, what I claim, and desire to secure by Letters Patent, is—

1. The tank A, with its well D E and compartments G connected by pipes $h$, and having the discharge-opening $r$, in combination with the perforated pipe $a$ and pipe J, substantially as and for the purpose above described.

2. The water-joint consisting of the raised flanges $o$ $n$ and pipe J, in combination with the pipes $a$ $s$, substantially as and for the purpose set forth.

In witness whereof I hereunto set my hand and seal.

FERDINAND FIEDLER. [L. S.]

Witnesses:
Z. W. CHRISTOPHER,
J. B. RANDOL.